FIG. I

INVENTOR
HUBERT J. SCHLAFLY, JR.
BY
Pennie Edmonds Morton Barrows Taylor
ATTORNEYS Dec. 4, 1962 H. J. SCHLAFLY, JR 3,067,280

SECRET SIGNALING

Filed Sept. 15, 1959 4 Sheets-Sheet 2

INVENTOR
HUBERT J. SCHLAFLY, JR.
BY
Pennie Edmonds Morton Barrows & Taylor
ATTORNEYS INVENTOR
HUBERT J. SCHLAFLY, JR.
BY
Pennie Edmonds Morton Barrows & Taylor
ATTORNEYS Dec. 4, 1962 H. J. SCHLAFLY, JR 3,067,280

SECRET SIGNALING

Filed Sept. 15, 1959 4 Sheets-Sheet 4

INVENTOR
HUBERT J. SCHLAFLY, JR.
BY
Pennie Edmonds Morton Barrows & Taylor
ATTORNEYS 3,067,280
SECRET SIGNALING Hubert J. Schlafly, Jr., Hollis, N.Y., assignor to Teleprompter Corporation, New York, N.Y., a corporation of New York Filed Sept. 15, 1959, Ser. No. 840,171
4 Claims. (Cl. 178—5.1)

This invention relates to secret signaling. The invention provides a secret signaling system which does not depend on or employ a cipher but which employs instead a mixture of the intelligence with a masking signal having components in the same range of frequencies and in the same range of amplitude variations as the intelligence. According to the invention identical records of such a masking signal are provided at both the transmitting and receiving stations. The intelligence desired to be transmitted, for example an audio or video signal, is translated by means of a suitable transducer into an electrical signal. To this electrical signal there is added, at the transmitting station, an electrical signal representative of the recorded masking signal. The combined intelligence and masking signal is then sent to the receiving station over a suitable transmission system, either wired or wireless. At the receiving station the masking signal is reproduced from the recording there available, inverted in polarity, and added to the total received signal in closely controlled time phase. Suitable means are provided to synchronize the reproduction of the inverted masking signal with the masking signal as received. With such synchronization, the sum of the received signal and the reproduced inverted masking signal is the original intelligence.

The invention will now be further described with reference to the accompanying drawings in which.

Figure 1:
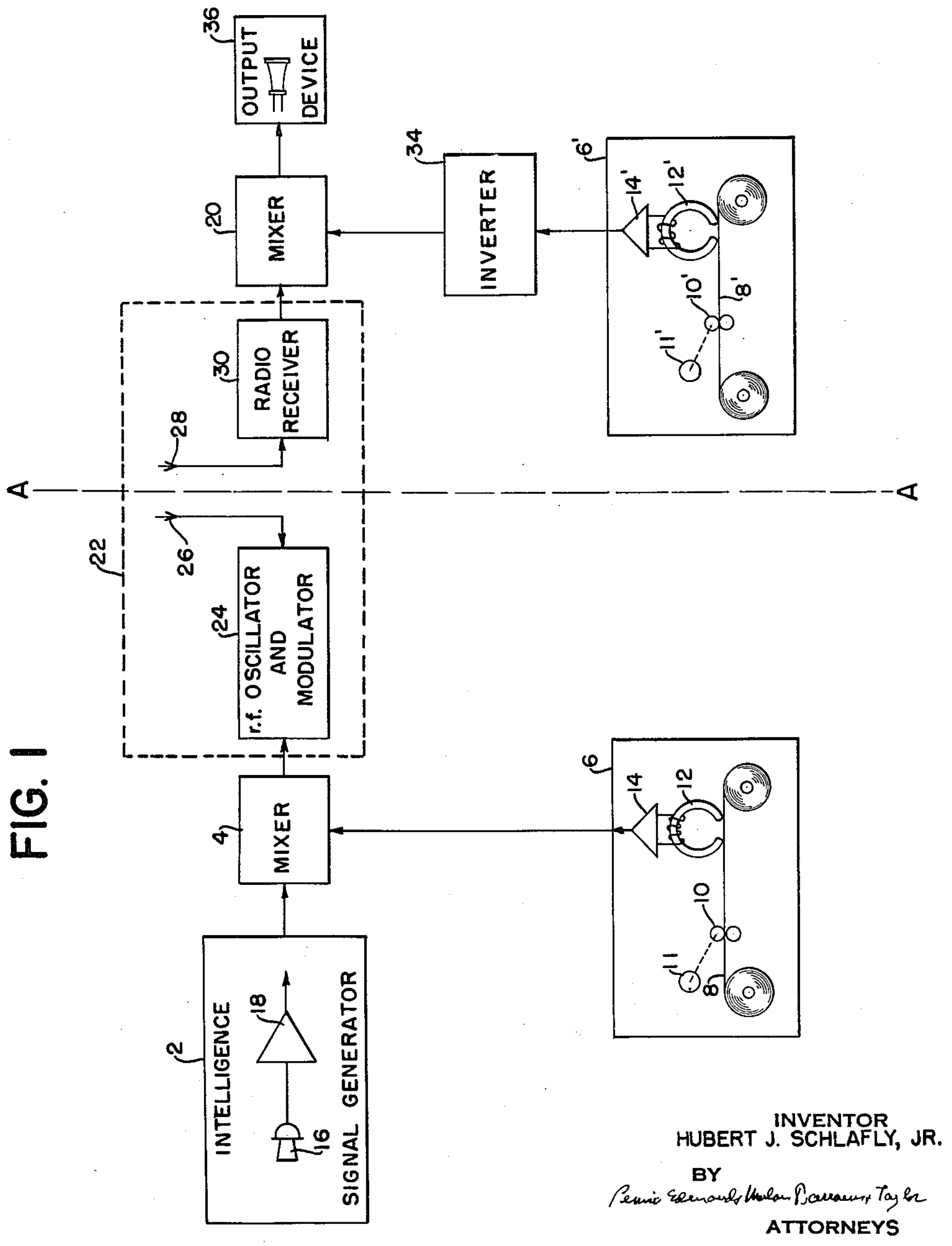
FIG. 1 is a schematic diagram, in block diagram form, of a signaling system in accordance with the invention.

In FIG. 1 the components to the left of line A—A constitute a transmitting station while those to the right of line A—A constitute a receiving station. At the transmitter an intelligence signal generator 2 generates an output signal, electrical or electromagnetic in form, whose variations with time are representative of the intelligence desired to be transmitted to the receiving station. This output signal is delivered to a mixer 4 which also receives, and combines therewith, an electrical masking signal developed in a masking signal generator 6. The masking signal generator comprises in a preferred embodiment of the invention a record, as on a magnetic tape 8 for example, of a suitable masking signal. It also comprises means such as a capstan 10 and motor 11 to drive the tape and a transducer 12 and amplifier 14 to generate an electric or electromagnetic masking signal from the tape record.

Figure 2:
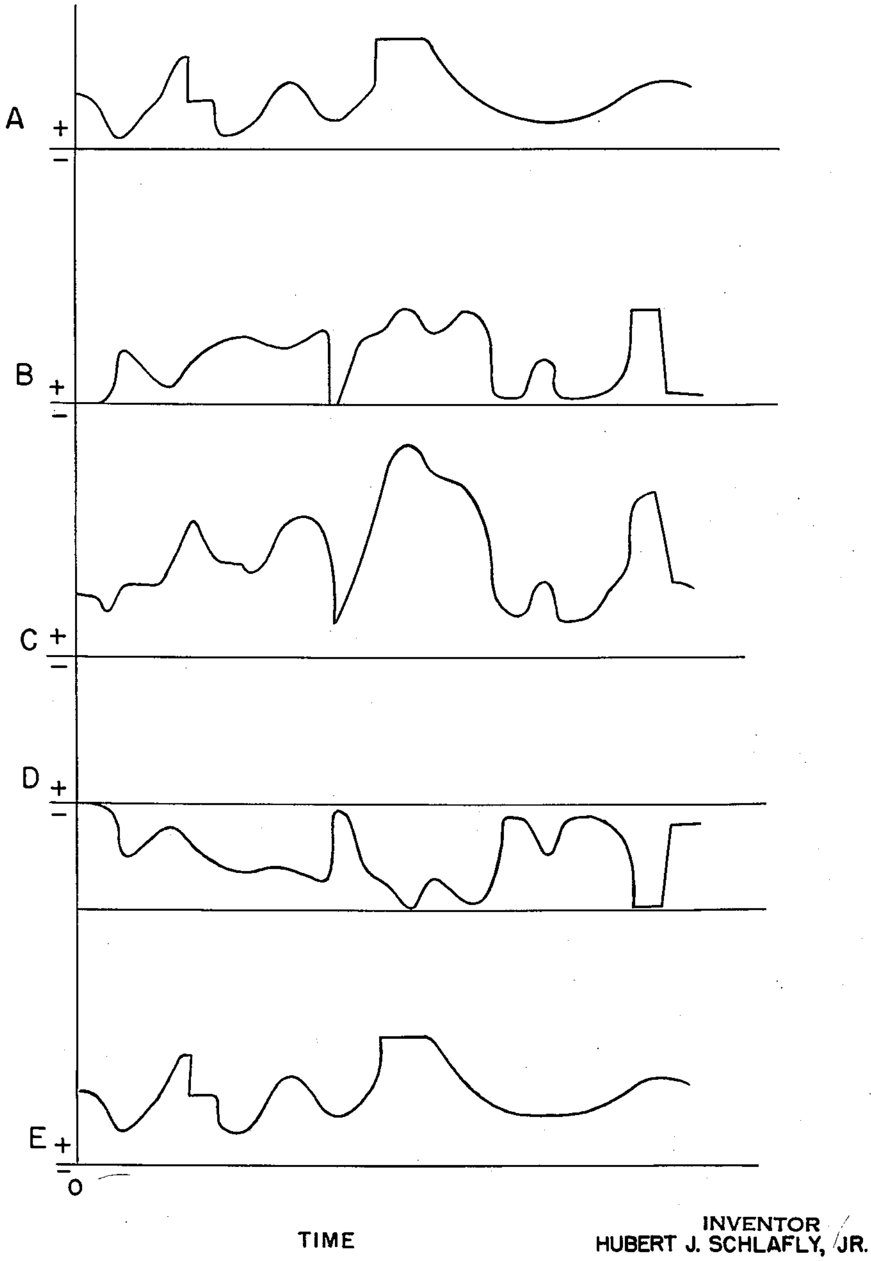
FIG. 2 is a series of graphs useful in explaining the operation of the invention.

A sample of an exemplary intelligence signal developed in generator 2 is indicated at waveform A in FIG. 2, where voltage is plotted vertically against time horizontally. In waveform B a sample of an exemplary masking signal is shown, with the same coordinates. These two signals are added together in mixer 4, to produce an output signal as shown at waveform C in FIG. 2.

The generator 2 includes a transducer, such as a microphone 16 (in the case of an intelligence signal in the audio range of frequencies) or a television camera, and one or more amplifiers 18, all of which components may be conventional. The transducer, record drive, and amplifier components in generator 6 may likewise be conventional. So may also be the components of the mixer 4. The mixer may take the form of a summing amplifier, or it may comprise simply a passive network, developing across a resistor the sum of the two input voltages to the network. It may of course include a further amplifier or amplifiers.

The output signal from the mixer 4 is delivered to a mixer 20 at the receiving station over a transmission line indicated at the dash line box 22.

The transmission line 22 which connects mixer 4 at the transmitter with mixer 20 at the receiver may be of any type suitable to transmission of the signal C of FIG. 2. It may be wired or wireless; it may involve superposition of the mixer output signals as some form of modulation on a carrier, or it may not involve the use of any carrier wave. Of the transmission line, including any terminal equipment appurtenant thereto which intervenes between the two mixers 4 and 20, it is required only that it will deliver from mixer 4 to mixer 20 a duplicate of signal C in FIG. 2, without excessive degradation.

For purposes of illustration only the transmission line is shown as comprising at the transmitter a radio frequency oscillator and modulator unit 24 connected to an antenna 26 and, at the receiver, an antenna 28 and a radio receiver unit 30 which contains an oscillator, frequency converter and second detector.

At the receiving station a masking signal generator 6′, which may be identical with generator 6, is energized to develop a duplicate of the signal produced by generator 6. Generator 6′ is shown as including components bearing the same reference characters as do the components of generator 6, those of generator 6′ being distinguished by primes.

The signal produced by generator 6′ is inverted in an inverter 34 to develop a signal as illustrated at waveform D in FIG. 2, substantially identical in shape and time phase but in opposite polarity from masking signal B. One, or some other odd number of stages of vacuum tube amplification is sufficient to perform this inversion.

Signals C and D (FIG. 2) are added together in mixer 20 and the result, which as shown at waveform E is substantially a dpulicate of the original intelligence signal A, is delivered to an output device 36. This may for example take the form of a loud speaker or telephone receiver in the case of audio intelligence, or a television reproducing apparatus, in the case of video frequency intelligence.

Masking signal generators 6 and 6′ contain record tapes 8 and 8′ which are duplicates of each other, and the two generators must be operated in synchronism such that the output signal of generator 6′ as inverted in inverter 34 (signal D, FIG. 2) reaches mixer 20 at the same time as do the corresponding portions of signal A as they appear in mixer 20 as part of signal C, and with the same amplitude at the point of combination in mixer 20 as those portions there possess. While this may be done, at least for short-duration intelligence signals containing low frequencies only, by pre-scheduled simultaneous energization of the masking signal generators 6 and 6′ or with the help of synchronizing signals not contained on the records 8 and 8′, the invention employs, in a presently preferred embodiment, recurrent synchronizing signals. These are generated at both transmitter and receiver, and the transmitter and receiver masking signals are generated or controlled in fixed time relation thereto. The two sets of synchronizing signals are then compared with each other at either the transmitter or the receiver to insure synchronous generation of the two masking signals.

Thus advantageously the identical masking signal records provided in the masking signal generators at the transmitting and receiving stations contain identical recorded synchronizing signals, and the "sync" signals reproduced from the record in the generator at the transmitter compared at the receiving station with the sync signals reproduced from the record at the receiving station in order to control the timing and rate of operation of the receiver masking signal generator. In this way proper synchronism may be maintained between the masking signals as they are recombined in the mixer at the receiving station, so that a proper cancellation of the masking signals may be obtained there.

Figure 3:
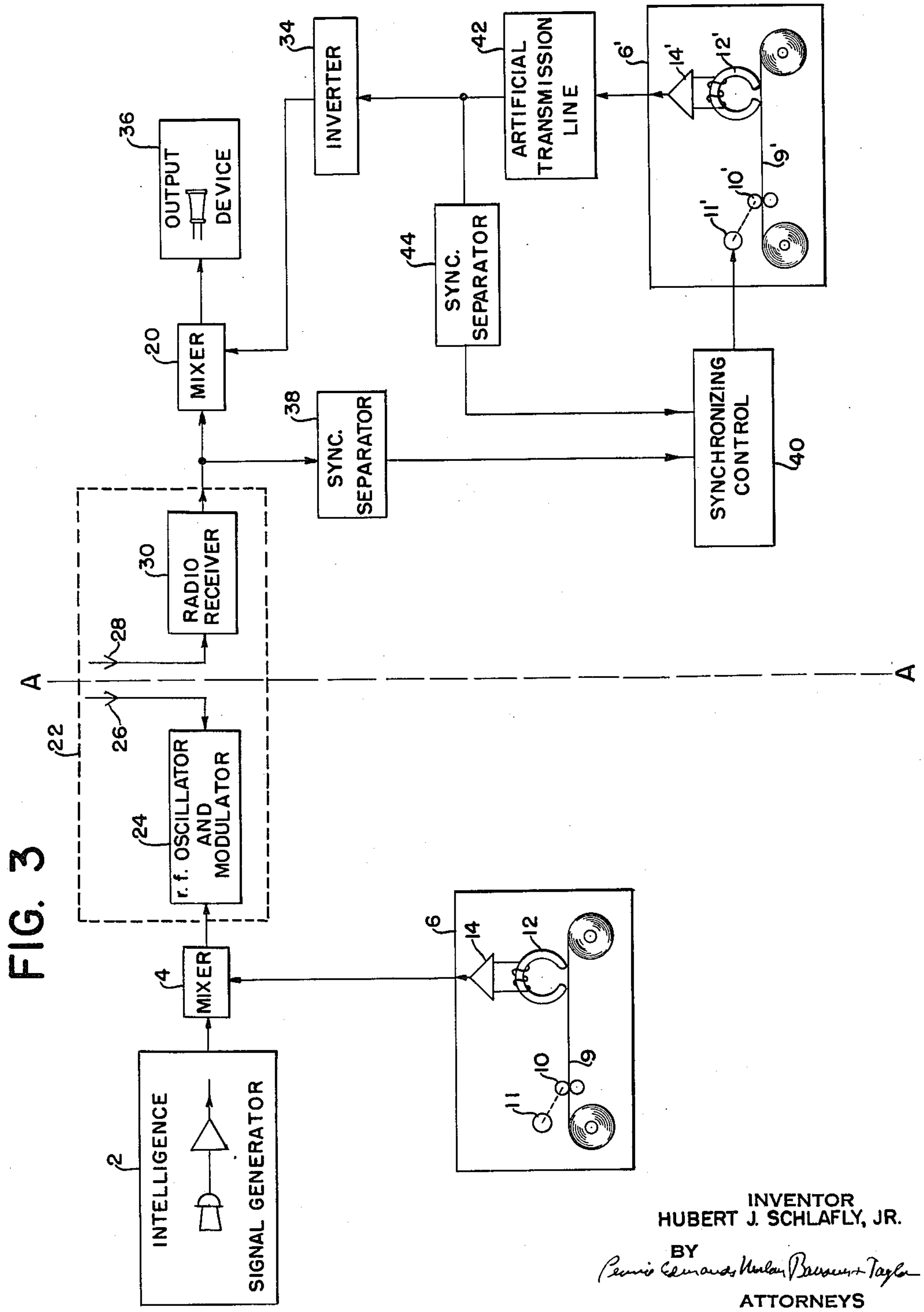
FIG. 3 is a schematic diagram, in block diagram form, of another embodiment of the invention.

FIG. 3 illustrates an embodiment of the invention employing such synchronizing signals. The components at the transmitting station may be the same as in the embodiment of FIG. 1, except that the masking signal record employed in generator 6 (and also that employed in the masking signal generator at the receiver) includes periodic synchronizing signals. These records are accordingly identified in FIG. 3 by the reference characters 9 and 9′ respectively.

The synchronizing signals may be recorded directly with the masking signals, or they may be recorded separately, for example on a parallel sound track on the same tape.

Referring again to FIG. 3, the output of the sending station mixer 4 now includes the intelligence signal, the masking signal and suitable synchronizing signals. This output is then delivered to the transmission line 22.

At the receiving station of FIG. 3 the mixer 20, receiver 30, inverter 34 and output device 36 may be the same as the correspondingly numbered components of FIG. 1, and the same is true of generator 6′ in FIG. 3 except that, as already stated, the masking signal record 9′ therein includes the same synchronizing signals as does the record 9 in the generator 6 at the transmitter station in FIG. 3.

The sum of the intelligence, masking and synchronizing signals is delivered by receiver 30 in FIG. 3 to mixer 20. The output of receiver 30 is also supplied however to a sync separator 38, which separates out the received sync signals for comparison in a sync control unit 40 with the sync signals reproduced at the receiving station from the record 9′ in masking signal generator 6′ there, in order to control the rate at which that masking signal will be reproduced. This separation may be effected by means of circuits, well known in the television art selectively responsive to differences between the amplitude and frequency content of the synchronizing signals and that of the intelligence and masking signals also appearing at the output of receiver 30.

Since the transmission line 22 will to some degree alter the output of mixer 4, an artificial transmission line 42 may be connected between the output of generator 6′ in FIG. 3 and inverter 34. The output from line 42 therefore closely matches the masking and sync signals as these are contained in the output of receiver 30.

As modified by line 42, the mixed masking and synchronizing signals generated in generator 6′ are sent to inverter 34, from which they pass after inversion to mixer 20, and also to a sync separator 44. In separator 44 the sync signals reproduced from record 9′ are separated out and supplied to sync control unit 40, where they are compared with the sync signals received from the transmitter station for adjustment of the rate of the drive motor 11 in generator 6′, so that the masking signal as applied to mixer 20 from receiver 30 will combine in that mixer in synchronism with the inverted masking signal applied thereto from inverter 34. Circuits suitable for the control unit 40 are also well known in the television and fascimile arts.

With such synchronism, mixer 20 will effect cancellation of the two sets of masking signals and also of the two sets of sync signals which it receives. Hence it is only the intelligence signal which is delivered to output device 36 in FIG. 3, for translation into some suitable form such as audible or visible, or for the making of a record thereof.

Figure 4:
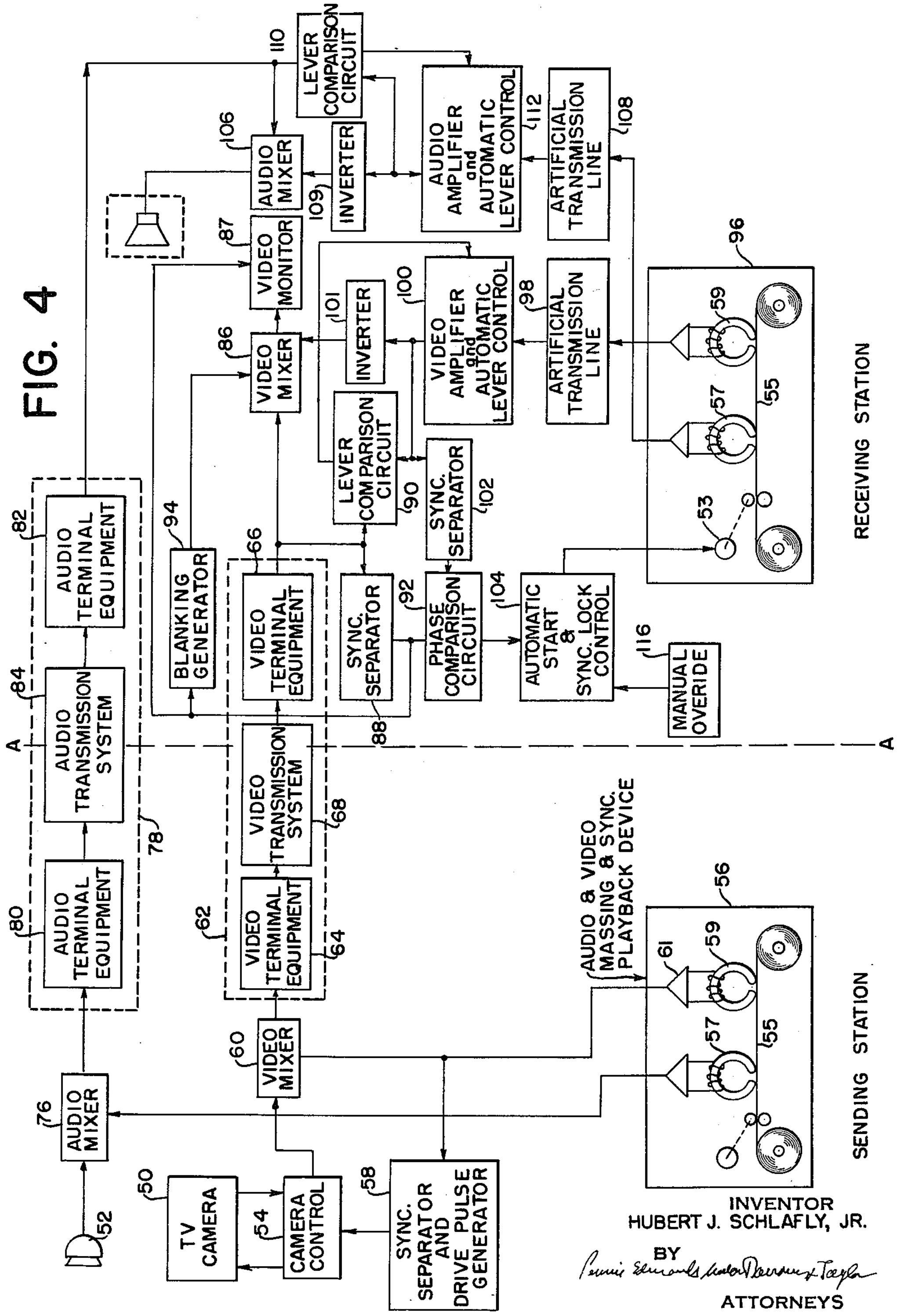
FIG. 4 is a block diagram of still another embodiment of the invention.

FIGURE 4 is a diagram of a secret signaling system according to the invention for handling a combined audio-video transmission. Since separate tracks can be recorded simultaneously on one magnetic tape, only one set of sychronizing signals is required to handle separate masking signals for the audio and video intelligence signals. In FIG. 4 the transmitting station is shown to the left of line A—A, and the receiving station is shown to the right of line A—A. At the transmitter there is shown a television camera 50, which is the electrical transducer for the visual intelligence, and a microphone 52, which is the electrical transducers for the aural intelligence. The television camera can be a standard device using commercial line and field scanning rates and waveforms, although for the sake of additional security in communication it may employ a non-standard line and field scanning rate and/or a non-standard method of line scanning. Hereinafter, customary television scanning standards will be assumed for simplicity in description.

In the embodiment of FIG. 4, which includes an intelligence signal of television form, a single set of sync signals is used for two distinct functions. The first of these is the synchronization at the receiver of the audio and video masking signals (as there reproduced) with the audio and video masking signals as received from the transmitter along with the intelligence signals, in order that the latter may be recovered. The second function is synchronization of the scanning process in the television reeciver with the received television intelligence, so that the television picture may be correctly reproduced. For this reason, the sync signals for control of camera 50 originate on the record 55 in the masking signal generator 56.

Generator 56 may be fundamentally of the same construction as generator 6 of FIGS. 1 and 3, except that it includes records of separate audio and video masking signals. Most conveniently these are in parallel tracks on a common tape record medium, onto one of which tracks are also recorded a set of synchronizing signals which as already stated may be standard television synchronizing signals. Conveniently these are recorded on the same track of tape 55 as the video masking signal. Separate playback transducers 57 and 59 engage the audio and video record tracks respectively.

The audio masking signal is passed from transducer 57 to an audio mixer 76. The video masking and sync signals are passed from transducer 59 to a video mixer 60, and also to a sync separator 58 which separates out the sync pulses and which further develops therefrom horizontal and vertical drive and blanking pulses for delivery to a camera control unit 54. Unit 54 governs the operation of camera 50 to develop picture signals properly timed with reference to the horizontal and vertical synchronizing pulses.

A complete video signal, including picture signals and horizontal and vertical blanking pulses but without sync pulses, is delivered from control unit 54 to video mixer 60.

The line and frame sync pulses are suppressed in the camera output because they are being applied to mixer 60 from playback unit 56. Proper relative amplitude adjustment is of course made of the signals applied to mixer 60 from control unit 54 and from playback unit 56, by means of amplifiers which may be provided in both—such as for example the amplifier 61 in the video masking signal channel in playback unit 56.

Addition in mixer 60 of the signals from camera control 54 to the masking signal and line and frame sync pulses from generator 56 provides at the output of mixer 60 a signal suitable for delivery, by a transmission line indicated at dash line box 62, to the receiving station. This transmission line is shown as including video terminal apparatus units 65 and 66 at the transmitting and receiving stations respectively, and a video signal transmission system 68 connecting them. While differently illustrated, the components in dash line box 62 of FIG. 4 perform together exactly the same function in the secret signaling system of FIG. 4 as do together the components shown within dash line box 22 of FIGS. 1 and 3.

The audio intelligence signal developed in microphone 52 is mixed in mixer 76 with the audio masking signal from transducer 57. The output of mixer 76 is then delivered to an audio signal transmission line indicated at dash line box 78. The transmission line 78 includes terminal equipment units 80 and 82 at the transmitting and receiving stations respectively, and transmission system 84 connecting units 80 and 82 together. Again the dash line box 78 of FIG. 4 includes components whose combined function is the same, so far as the secret signaling system of the invention is concerned, as the function of dash line box 22 in FIGS. 1 and 3.

The components in dash line boxes 62 and 78 may be of the type conventionally used for video and audio service respectively. Moreover, separate transmission systems as shown are not necessary. Instead, the video and audio signal outputs of mixers 60 and 76 may be multiplexed within a single transmission system, as is the current practice in commercial television broadcasting.

The receiving station of FIG. 4 exhibits basic similarities with that of FIG. 3. For each of the intelligence signals of FIG. 4 there is provided a mixer, to which is applied the received combination of an intelligence and a masking signal and also a locally reproduced and inverted masking signal. The output of the mixer is for each intelligence signal then supplied to a display or output device, where the intelligence signal, recovered in the mixer free of masking signal, is presented. In addition, in FIG. 4 as well as in FIG. 3, the masking signal generator at the receiver is controlled in time by comparison, in a synchronizing control circuit, of the received synchronizing signals (after separation from the received intelligence and masking signals) with the sync signals reproduced in the receiver masking signal generator.

Additional components are however provided in view of the particular nature of television signals, assumed to form one of the two intelligence signals handled by the system of FIG. 4, and to assure automatic matching in the mixers of the amplitude levels of the signals to be combined there.

In particular, in the receiver of FIG. 4, the output of video transmission line 62 is delivered to a sync separator 88 and to a level comparison circuit 90 as well as to a video mixer 86. Mixer 86 also receives a video masking signal, from masking signal generator 96 via an artificial line 98, an automatic level control unit 100 and an inverter 101 to be described presently. The output of mixer 86 is applied to a video monitor 87, which comprises a television receiver less radio frequency and intermediate frequency parts.

The sync signals extracted in separator 88 are compared in a phase comparison circuit 92 with the sync signals reproduced in masking signal generator 96, after passage through artificial line 98, video amplifier and automatic level control circuit 100, and a sync separator 102 which separates the sync signals developed in generator 96 from the accompanying masking signal. Generator 96 may be identical with generator 56.

The output of phase comparison circuit 92 governs a sync-loc control circuit 104, which by operation on drive motor 53 in generator 96 controls the rate of playback in that generator of the masking and sync signal record 55 therein.

For the audio signal there is similarly a mixer 106, to which the received audio intelligence and masking signals are applied from transmission line 78. The audio masking signal regenerated by transducer 57 in generator 96 is also delivered to mixer 106, after passage through an artificial line 108, an audio automatic level control unit 112, and an inverter 109. Line 108 is designed to match the transmission properties of line 78.

In both the video and audio channels, there may be provided means to adjust automatically the level of the locally generated masking signal in order that that signal will have, in the mixer to which it is to be delivered, the same amplitude as the masking signal delivered to that mixer in superposition on the intelligence signal. In the video signal channel these means comprise a level comparison circuit 90 having as inputs the combined video intelligence, video masking and synchronizing signal output of transmission line 62 and also the locally regenerated video masking and synchronizing signal output of generator 96, after passage through the artificial line 98 and through a video amplifier and automatic level control unit 100 which is interposed between line 98 and the inverter 101 which leads to video mixer 86.

Comparison circuit 90 develops an output signal representative of the difference between the masking and synchronizing signal output of amplifier 100 and the masking and synchronizing signal output of receiver 66, and this output signal of circuit 90 is applied to the video amplifier and level control 100 to adjust the gain thereof in order to reduce this difference to zero. Compensation may be made for the fact that the signal applied to comparison circuit 90 from transmission line 62 includes the masking and synchronizing signals as superposed on the video intelligence signal.

In the same manner, in the audio signal portion of the receiving station of FIG. 4, the combined audio intelligence and masking signal received at receiver 82 is applied not only to mixer 106 but to a level comparison circuit 110. Circuit 110 receives in addition the output of an audio amplifier and automatic level circuit 112 which is inserted between artificial line 108 and inverter 109 which leads to audio mixer 106. The operation of circuits 110 and 112 is the same with respect to the received audio intelligence and masking signal on the one hand and the locally regenerated audio masking signal on the other hand as is the operation of the circuits 90 and 100 in the video channel with respect to the received video intelligence and masking signals on the one hand and the locally regenerated video masking signal on the other.

For proper reproduction of the television signals in video monitor 87, the sync signals as received from transmission line 62 and separated out in separator 88 are applied to the monitor 87 and to a blanking generator 94. Generator 94 develops horizontal and vertical blanking pulses which are delivered to mixer 86.

While the phase comparison circuit 92 and the synchronizing control circuit 104 will serve to maintain proper synchronism between the two versions of the masking signals applied to mixers 86 and 106 provided such synchronism is once established, they do not insure establishment of the necessary initial synchronism. By the transmission from the transmitting station to the receiving station of a signal which starts the masking signal generators 56 and 96 simultaneously at both stations, and with equal initial settings of the tapes or other record media in those generators with respect to their playback transducers 57 and 59, the two versions of the masking signals may be brought into synchronism within an error of the order of a fraction of a second. This is of course very large compared to the degree of synchronism required, which is frame-for-frame synchronism of the television intelligence signal and indeed a synchronism line-for-line and picture element-for-picture element; since the video masking signal includes frequency components in the range of frequencies of the picture elements. To achieve synchronism of this order of exactness the initial portion of both record tapes is preferably made as a "synchronizing leader" without masking material thereon. Such a synchronizing leader may be a record of a standard television raster containing a single vertical line which is slowly moved from frame to frame horizontally across the picture.

If now the generators 56 and 96 are set into operation as nearly simultaneously as possible by switching operations performed on their driving devices, the video monitor output device 114 will show two vertical lines, if synchronism at the mixer 86 is not perfect. Temporary corrections to the playback speed may be manually applied thereto by means of a manually overriding control circuit 116 coupled to control 104 until the two vertical lines in the display 114 are exactly superposed on each other.

The essential property of the sync signals is that, as transmitted to the receiving station as part of the mixed or combined intelligence and masking signals (waveform C in FIG. 2) they must be recognizable so that synchronism may be established between these sync signals appearing on top of the received intelligence and the masking and sync signals reproduced at the receiving station from the masking and sync signal record there. In practice this means that the sync signals must differ in frequency or amplitude content or both sufficiently so that they may be separated, in the one case from the combined received intelligence and masking signals, in the other case from the reproduced masking signal. They must also be repeated often enough so that the masking signal generator at the receiver does not get out of step with the masking signal at the transmitter between correcting impulses delivered to the generator at the receiver from the sync signal comparison and control circuit sufficiently to destroy the intelligibility of the intelligence at the output of the receiver mixer.

The masking signals, whether audio, video, or of other types or frequency ranges, should be made up of frequency components in the same bands of frequencies as those occupied by the intelligence signals, which they are respectively to mask. Video masking signals may be made up from a succession of kaleidoscopic images, or from ordinary television material unrelated in content to the intelligence to be transmitted. Audio masking signals may be made up from a mixture of human speech, or from the sound of machinery or the like. In any case, it is presently preferred that the amplitude level of the masking signal be, at the point of its mixing with the intelligence, at the transmitting station, somewhat higher than the amplitude level of the intelligence. A difference between the average levels of the two signals of the order of 10 db appears to be satisfactory.

While the invention has been described herein in terms of a number of preferred embodiments, it is not limited thereto. The intelligence need be neither of audio or video type. For example, sub-audio frequencies may be employed. Neither is the invention limited to the particular means which have been described for establishing initially synchronism between the two masking signals which are to be combined at the receiver for recovery of the intelligence, since other arrangements for achieving this result will easily occur to the man skilled in the art. This refers of course to the averages of the A.C. components of the intelligence and masking signals. The waveforms of FIG. 2 only indicate in a qualitative way that the masking signals may advantageously be higher in amplitude than the intelligence signals.

The A.C. reference levels in FIG. 2 are arbitrary and without essential significance to the invention. They have been shown because of the familiar nature of a combined high frequency and D.C. signal in the television art. The invention is not however limited to intelligence signals of the television type, and the waveforms of FIG. 2 would be equally valid without D.C. reference levels of any kind.

I claim:

1. A secret signaling system comprising transmitting and receiving stations, transmitter and receiver record means at said transmitting and receiving stations respectively, each of said record means bearing a recording of a masking signal, said masking signals being identical, said masking signals containing identical synchronizing components distributed through the duration of said masking signals, a first transducer at the transmitting station arranged to generate a first signal corresponding to the masking signal on said transmitter record means and a second transducer at the transmitting station arranged to generate a second signal representative of intelligence to be transmitted to said receiving station, means to sum said first and second signals and to transmit said summed signals to said receiving station, a transducer at said receiving station arranged to generate a third signal from said receiver record means, means at said receiving station to compare the time relation between the synchronizing components in said third signal and the synchronizing components in said summed signals, means at said receiving station controlled by said comparing means to adjust the time relation of said summed signals and third signal to produce time coincidence of the synchronizing components in said third signal with the synchronizing components in said summed signals, means to add said third signal and summed signals as so adjusted with said third signal and the first signal in said summed signals in phase opposition, and a transducer coupled to said adding means.

2. A secret signaling system comprising transmitting and receiving stations, transmitter and receiver record means at said transmitting and receiving stations respectively, each of said record means bearing a recording of a masking signal, said masking signals being identical, said masking signals containing identical synchronizing components distributed through the duration of said masking signals, a first transducer at the transmitting station arranged to generate a first signal corresponding to the masking signal on said transmitter record means and a second transducer at the transmitting station arranged to generate a second signal representative of intelligence to be transmitted to said receiving station, said second signal having frequency components within the band of frequencies occupied by said masking signals, means to sum said first and second signals and to transmit said summed signals to said receiving station, a transducer at said receiving station arranged to generate a third signal from said receiver record means, means at said receiving station to compare the time relation between the synchronizing components in said third signal and the synchronizing components in said summed signals, means at said receiving station controlled by said comparing means to adjust the time relation of said summed signals and third signal to produce time coincidence of the synchronizing components in said third signal with the synchronizing components in said summed signals, means to add said third signal and summed signals as so adjusted with said third signal and the first signal in said summed signals in phase opposition, and a transducer coupled to said adding means.

3. A secret signaling system comprising transmitting and receiving stations, transmitter and receiver record means at said transmitting and receiving stations respectively, each of said record means bearing a recording of an audio masking signal, said masking signals being identical, said masking signals containing identical synchronizing components distributed through the duration of said masking signals, a first transducer at the transmitting station arranged to generate a first audio signal corresponding to the masking signal on said transmitter record means and a second transducer at the transmitting station arranged to generate a second audio signal representative of intelligence to be transmitted to said receiving station, means to sum said first and second signals and to transmit said summed signals to said receiving station, a transducer at said receiving station arranged to generate a third signal from said receiver record means, means at said receiving station to compare the time relation between the synchronizing components in said third signal and the synchronizing components in said summed signals, means at said receiving station controlled by said comparing means to adjust the time relation of said summed signals and third signal to produce time coincidence of the synchronizing components in said third signal with the synchronizing components in said summed signals, means to add said third signal and summed signals as so adjusted with said third signal and the first signal in said summed signals in phase opposition, and a transducer coupled to said adding means.

4. A secret television signaling system comprising transmitting and receiving stations, transmitter and receiver record means at said transmitting and receiving stations respectively, each of said record means bearing a recording of a video masking signal, said masking signals being identical, said masking signals containing identical synchronizing components in the form of television line and frame synchronizing impulses distributed through the duration of said masking signals, a first transducer at the transmitting station arranged to generate a first video signal corresponding to the masking signal on said transmitter record means and a second transducer at the transmitting station arranged to generate a second video signal representative of intelligence to be transmitted to said receiving station, said second video signal being composed of lines and frames defined by said synchronizing components as reproduced in said first video signal, means to sum said first and second signals and to transmit said summed signals to said receiving station, a transducer at said receiving station arranged to generate a third video signal from said receiver record means, means at said receiving station to compare the time relation between the synchronizing components in said third signal and the synchronizing components in said summed signals, means at said receiving station controlled by said comparing means to adjust the time relation of said summed signals and third signal to produce time coincidence of the synchronizing components in said third signal with the synchronizing components in said summed signals, means to add said third signal and summed signals as so adjusted with said third signal and the first signal in said summed signals in phase opposition, and a transducer coupled to said adding means.

References Cited in the file of this patent

UNITED STATES PATENTS

| | | |
|---|---|---|
| 2,083,653 | Kasemann | June 15, 1937 |
| 2,419,568 | Labin | Apr. 29, 1947 |
| 2,465,367 | Friedman | Mar. 29, 1949 |
| 2,552,548 | Friedman | May 15, 1951 |
| 2,656,411 | Morris | Oct. 20, 1953 |